United States Patent [19]

Bonde

[11] Patent Number: 4,467,695
[45] Date of Patent: Aug. 28, 1984

[54] SAFE JETTISON DEVICE FOR AIRCRAFT STORES

[75] Inventor: Robert L. Bonde, St. Louis Park, Minn.

[73] Assignee: The United States of America as represented by the Secretary of the Navy, Washington, D.C.

[21] Appl. No.: 489,920

[22] Filed: Apr. 29, 1983

[51] Int. Cl.³ .............................................. F41F 5/02
[52] U.S. Cl. .................................. 89/1.5 D; 294/83 R
[58] Field of Search ......................... 89/1.5 D, 1.5 E; 244/137 R; 102/396; 294/83 R

[56] References Cited

U.S. PATENT DOCUMENTS

| | | | |
|---|---|---|---|
| 2,918,845 | 12/1959 | Fleming | 89/1.5 |
| 3,326,083 | 6/1967 | Johnson | 89/1.5 D |
| 3,366,008 | 1/1968 | Grandy | 89/1.5 D |
| 3,476,012 | 11/1969 | Jackson | 89/1.5 D |
| 3,575,084 | 4/1971 | Glendenning et al. | 89/1.5 D |
| 3,703,844 | 11/1972 | Bleikamp | 89/1.5 D |
| 3,728,936 | 4/1973 | Norris | 89/1.812 |
| 3,939,754 | 2/1976 | Dexter | 89/1.5 D |
| 4,088,055 | 5/1978 | West et al. | 89/1.5 D |
| 4,167,887 | 9/1979 | Magro | 89/1.5 D |
| 4,266,462 | 5/1981 | Carter et al. | 89/1.5 D |
| 4,299,157 | 11/1981 | Burns et al. | 89/1.5 D |

Primary Examiner—David H. Brown
Attorney, Agent, or Firm—Robert F. Beers; W. Thom Skeer; Kenneth G. Pritchard

[57] ABSTRACT

A safe jettison device for aircraft stores is used to avoid unintentional arming of aircraft stores when they are jettisoned vice intentionally dropped. A coil is inserted in a conduit which prevents removal of the arming line unless the coil is skewed by a preset pulling force. If the store is released without skewing of the coil, the coil remains in the conduit and does not permit the arming line to be initiated. An activation device is held to the aircraft by a force less than the force needed to pull the coil free until an arming signal is given. Once an arming signal is given, the activation device holds with a greater force than that needed to pull the coil free.

11 Claims, 10 Drawing Figures

SAFE JETTISON DEVICE FOR AIRCRAFT STORES

BACKGROUND OF THE INVENTION

1. Field of the Invention

This invention is for a safe jettison device for aircraft delivered ordnance stores. In particular, the present invention is to ensure that ordnance stores dropped in the jettison mode are released in an unarmed condition.

2. Description of the Prior Art

Various techniques have been attempted to prevent arming of stores other than when actual live ordnance is desired to be dropped. These devices have included arming lines and other ways of initiating safety and arming devices which arm a bomb or missile. Such devices are to first protect the aircraft carrying the store and secondly anything or anyone on the ground beneath an inadvertently dropped store.

SUMMARY OF THE INVENTION

An ordnance device is fitted with an arming line conduit which has a contoured channel along its length. Within the contoured channel, a safe jettison coil is inserted from one end which can then be slid along the channel to a point where it is not capable of being extracted. The arming line itself is threaded through the jettison coil and the contoured opening of the conduit. In practice, the arming line is inserted through the jettison coil prior to insertion into the conduit. The jettison coil is enclosed by and supported by a loop of nylon strap. The jettison coil is in the form of a spring. By pulling on the nylon strap, the spring coils are forced to skew and deform within the conduit. At some level of skewing and deformation the coil is removed from the conduit. The arming line threaded through the coil comes with it as the store connected to the conduit falls away from the jettison coil. The nylon strap which supports the jettison coil is a radiation shield which is anchored by any suitable means, such as a solenoid, to the aircraft. An extractor, which is connected to the jettison coil, parts at a preset force level. When the extractor is connected to a solenoid, the preset force level is for the unactivated state. Energizing the solenoid raises the force needed to sever the extractor from the solenoid to a level greater than that needed to extract the jettison coil from the conduit. Thus, should the store be separated from the aircraft prior to the solenoid energizing, the arming line remains within the conduit and cannot create a live ordanance.

BRIEF DESCRIPTION OF THE DRAWINGS

FIG. 3A is one perspective of the extractor;
FIG. 3B is a side view of the above extractor;
FIG. 3C is a close-up view of the coil end of the extractor;
FIG. 4 shows the dimensional relationship of coils and conduit;
and
FIG. 5 shows the coils skewed and deformed.

DESCRIPTION OF THE PREFERRED EMBODIMENT

Figure 1A:
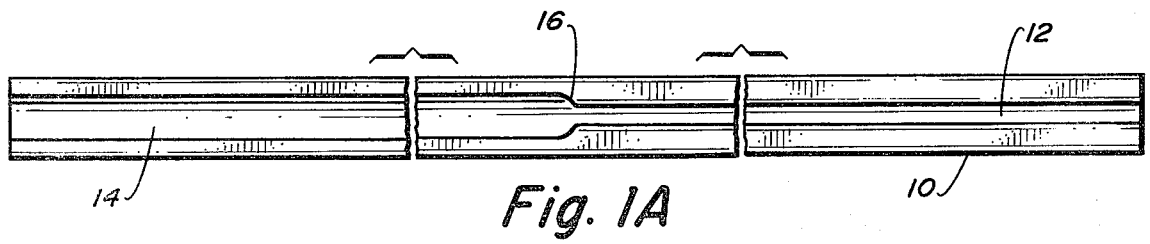
FIG. 1A is a top view of the arming line conduit.
Figure 1B:
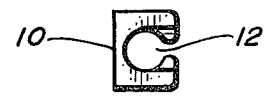
FIG. 1B is an end view of the arming line conduit.
Figure 1C:
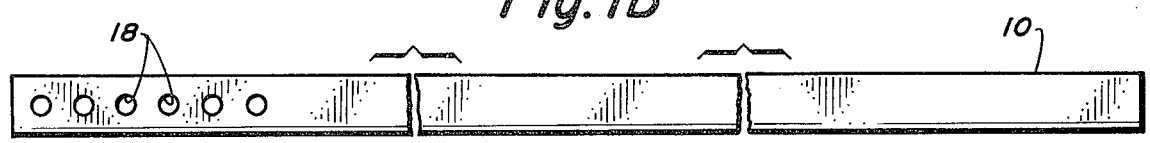
FIG. 1C is a side view of the arming line conduit.

In FIG. 1A, arming line conduit 10 is shown with a slot 12 that starts at one end and goes through and terminates as a slot 14. The difference in slot 14 being a larger diameter than slot 12. Transition region 16 tapers slot 14 into slot 12. FIG. 1B is an end view of FIG. 1A and shows conduit 10 and slot 12 end-on. As seen from the end, conduit 10 is a circular shape which has one segment of the circumference removed. In effect, increased area of slot 14 really serves as an aid in inserting cylindrical items into conduit 10 which rest within the slot 12 section of conduit 10. FIG. 1C is a side view of conduit 10 and shows anchoring holes 18, one of which is used to anchor one end of the arming line to conduit 10. Several anchoring holes are provided for tolerance reasons. Conduit 10 ideally is made of an aluminum alloy material such as 606E-T6 in accordance with AMS4113 or an alternate version could use QQ-A-2037B, tempered T6. The anchoring is accomplished by running a spiral pin, not shown, through the appropriate hole and through a loop in the end of the arming line.

Figure 2A:
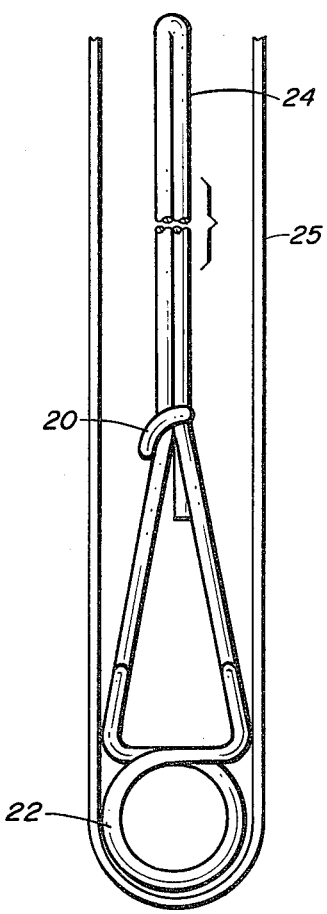
FIG. 2A is an end view of the safe jettison coil.
Figure 2B:
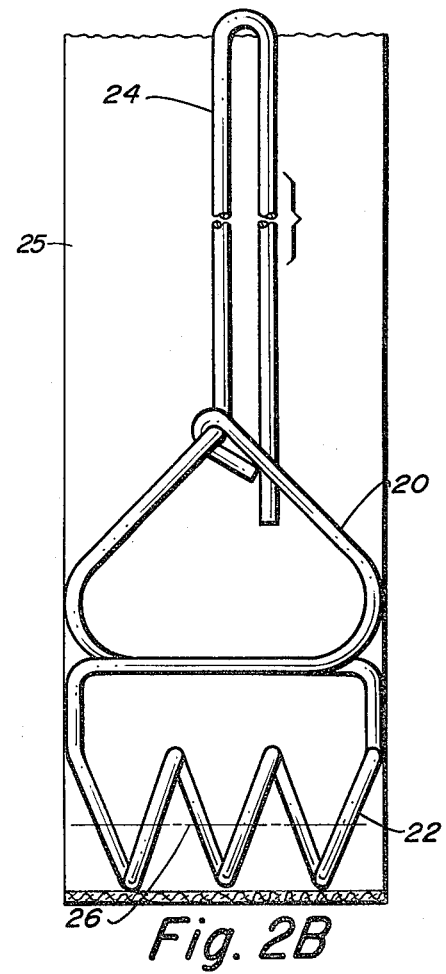
FIG. 2B is a frontal view of the safe jettison coil.

FIG. 2A shows a safe jettison coil 20 from a side view. Jettison coil 20 is made of steel wire such as music steel wire with spring quality such as might be found in accordance with ASTM7228. An alternate version can be made with QQW-470. Jettison coil 20 has handle 24 and coil 22. Encasing jettison coil 20 is a strap 25, which may be made of nylon webbing. As shown in front view 2B, jettison coil 20 has coil 22 in a helical spring format, with an axis 26. Coil 22 is inserted into conduit 10 via slot 14 and slid down to slot 12. A direct pull against conduit 10 is not sufficient for coil 22 to slip out of slot 12 until the force is sufficient to cause coil 22 to skew as shown in FIG. 5.

To remove jettison coil 20 by strap 25, a cord 38 is stitched to handle 24. Cord 38 is also connected to a mounting, such as a swivel 34. Cord 38 is connected to swivel 34 by a means which permits a controlled separation. One way to do this is to use a lark's head knot, not shown. A radiation shield 30 encases strap 25. A covering 32 encases cord 38. Radiation shield 30 and covering 32 prevent degradation, especially degradation caused by ultraviolet radiation. Radiation shield 30 and covering 32 are heat shrinkable sleeves. A similar protective cap 36 is placed on the bottom of strap 25. It is possible to use only two or a single heat shrinkable boot.

FIG. 3B shows a cutaway view of the extractor that is rotated 90° with respect to FIG. 3A. Jettison coil 20 with coil 22 enclosed in strap 25, is shown inside conduit 10. Handle 24 is secured to the webbing of strap 25 with a zigzag stitch. Swivel 34 is connected to any activated device. For example, a cone 50 connected to a solenoid 52 is shown passing through swivel 34 and pressing against a mount 54. When solenoid 52 is passive, the force needed to pull swivel 34 past cone 50 is a value significantly less than the force needed to skew coil 22. When solenoid 52 is activated by closing the switch 56, the force needed to pull swivel 34 clear is greater than that needed to skew coil 22. The section of FIG. 3A shown by line 3C is a close-up view shown in FIG. 3C. Cap 36 is shown over the handle part of jettison coil 20. Coil 22 enclosed in strap 25 is shown within conduit 10. Conduit 10 is mounted against ordnance surface 40. The force pulling in the direction of arrow 42 is designed to skew coil 22. For purposes of example only, assume solenoid 52 yields at 14 pounds of force unenergized and at 200 pounds of force when energized. Then, if 60 pounds of force is needed to skew coil 20, an inadvertent ordnance drop prior to energizing solenoid 52 causes swivel 34 to pull free and fall with the ordnance. Arming line 44 is never pulled. If solenoid 52 is energized, coil 22 skews and escapes the conduit when the ordnance falls away and arming line 44 is pulled. Arming line 44 is shown inserted within coil 22 as it sits within conduit 10.

FIG. 4 shows coil 22 with zones of interference caused by conduit 10. Conduit 10's throat is too narrow for coil 22 to pull free.

FIG. 5 shows coil 22 skewed in the direction of arrows 60. When the pulling force is great enough to skew coil 22 this much, no zones of interference remain and coil 22 is free to pull the arming cord, not shown.

It is obvious to those skilled in the art that numerous modifications of the above invention may be made.

I claim:

1. A safe jettison device for aircraft stores comprising:
   an arming line to trigger the store;
   an arming line conduit, which is slotted to hold said arming line, mounted near said store;
   a coil which fits into said conduit for removal of said arming line such that said arming line passes through said coil;
   a strap around said coil for pulling said coil until it skews and extracts said arming line from said conduit;
   a mounting connected to said strap; and
   an activation device connected to said mounting for holding said mounting with a first preset force prior to activation and a second different preset force after activation.

2. A safe jettison device for aircraft stores as described in claim 1 where said strap around said coil further comprises being enclosed by at least one covering to protect said strap.

3. A safe jettison device for aircraft stores as described in claim 1 where said activation device comprises a solenoid.

4. A safe jettison device for aircraft stores as described in claim 1 where said arming line conduit comprises an aluminum alloy.

5. A safe jettison device for aircraft stores as described in claim 4 where said strap around said coil further comprises being enclosed by at least one covering to protect said strap.

6. A safe jettison device for aircraft stores as described in claim 1 further comprising a cord attached to said coil and to said mounting.

7. A safe jettison device for aircraft stores as described in claim 6 where said activation device comprises a solenoid.

8. A safe jettison device for aircraft stores as described in claim 1 where said coil is comprised of spring quality steel wire.

9. A safe jettison device for aircraft stores as described in claim 8 where said strap around said coil further comprises being enclosed by at least one covering to protect said strap.

10. A safe jettison device for aircraft stores as described in claim 8 where said arming line conduit comprises an aluminum alloy.

11. A safe jettison device for aircraft stores as described in claim 10 where said strap around said coil further comprises being enclosed by at least one covering to protect said strap.

* * * * *